Oct. 3, 1933.     E. FELSMAN     1,928,975
SAW SET
Filed Feb. 24, 1932
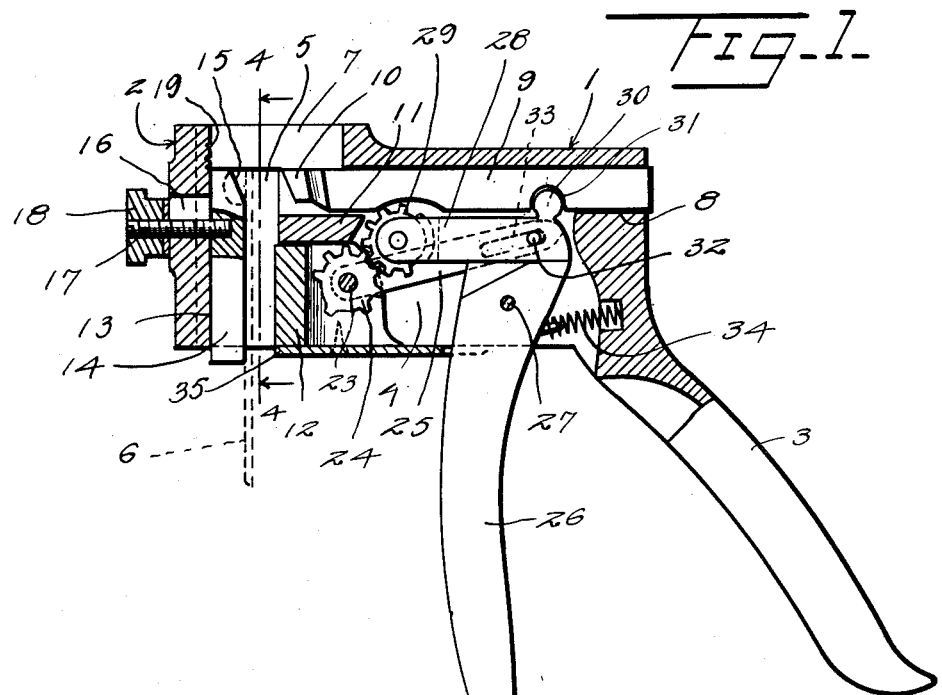
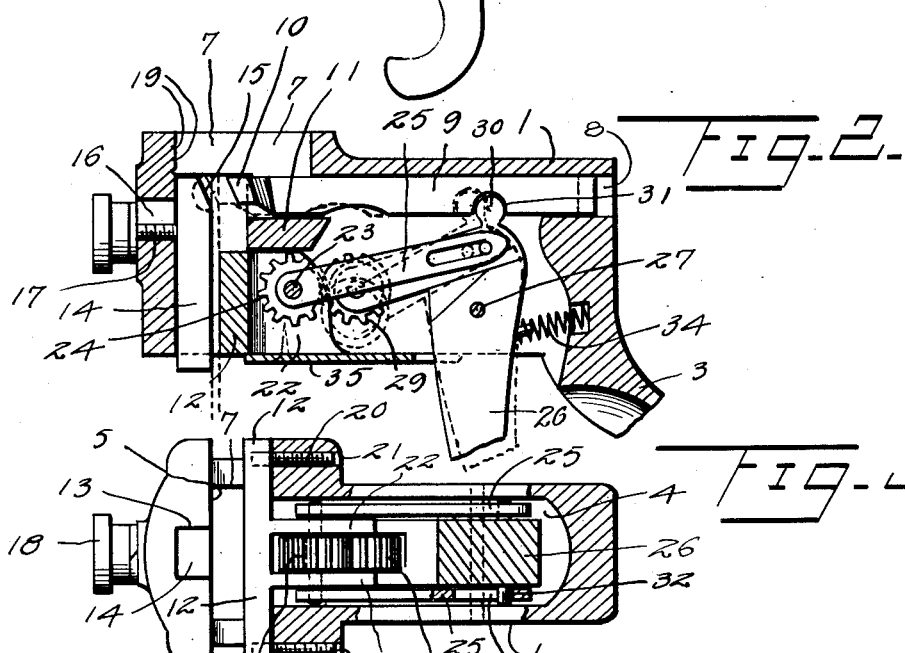
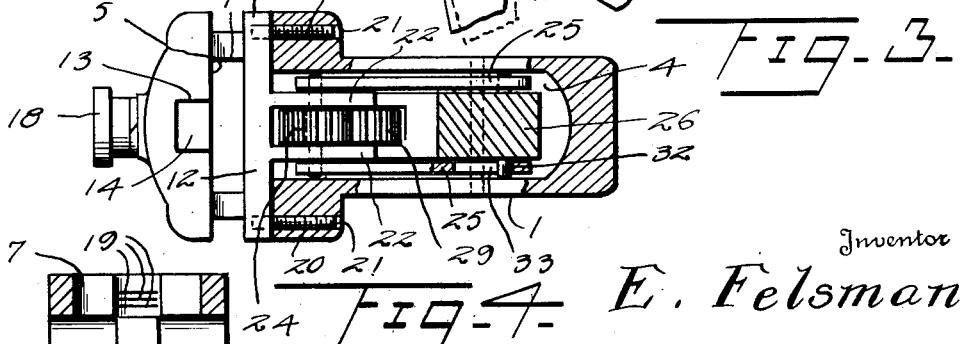
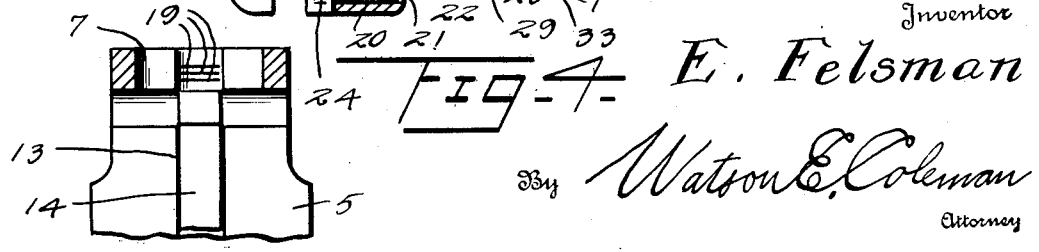
Inventor
E. Felsman
By Watson E. Coleman
Attorney Patented Oct. 3, 1933

1,928,975

UNITED STATES PATENT OFFICE 1,928,975

SAW SET

Edward Felsman, Rapid City, S. Dak.

Application February 24, 1932. Serial No. 594,902

8 Claims. (Cl. 76—69)

This invention relates to improvements in saw sets.

The primary object of the present invention is to provide a saw set which operates to grip and hold the body of the saw against movement while the tooth of the saw is being bent over into the desired set position, so that the body of the saw will not buckle during the performance of this operation.

Another object of the invention is to provide a saw set in which a clamp element operates in advance of the tooth bending element to secure the body of the saw, the tooth bending element then operating upon the tooth after the saw has been secured.

A still further object of the invention is to provide a new and novel coupling means between the trigger of the tool and a shiftable jaw of the saw clamping portion, whereby the smooth operation of the clamping jaw is effected and it is forced to retain its position while the plunger element of the tool which is also operated by the trigger, is caused to continue its movement for the bending of the saw tooth against the anvil.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view partly in elevation and partly in longitudinal section of the saw set embodying the present invention showing the parts in retracted or inoperative position;

Figure 2 is a sectional view of the body portion of the tool similar to Figure 1 with the exception that the shiftable elements thereof are shown in the position where the saw body has been changed and the plunger is about to force the tooth over against the anvil;

Figure 3 is a bottom plan view of the tool body, portions thereof being in section;

Figure 4 is a vertical sectional view taken upon the line 4—4 of Figure 1.

Referring now more particularly to the drawing wherein like numerals of reference indicate corresponding parts throughout the several views, the numeral 1 indicates generally the body of the present tool which as shown is relatively long and has a head portion 2 formed at one end, this head portion being of materially greater width than the body portion as shown in Figure 3. At the end of the body portion remote from the head there is formed integral therewith to extend rearwardly and obliquely therefrom, the fixed handle 3.

The body 1 is hollow from a point adjacent the rear end where the handle 3 is attached to the head portion 2 thus providing the chamber 4 in which the movable elements are mounted and the head 2 is provided with a transverse recess 5 which opens through the sides and the under face thereof for the reception of the toothed edge of the saw which is indicated in dotted lines and by the numeral 6, while the top of the head has the opening 7 therein through which the operation of the hereinafter described plunger may be noted.

In the top of the chamber 4 the body has formed therein a channel 8 in which is reciprocably mounted the elongated plunger member 9, the forward end of which is formed to provide the beveled setting tooth 10 which extends into the opening 7 of the tool head and when shifted forwardly moves across the transverse slot 5 in which the saw body is located.

The forward end of the plunger 9 rides over and is supported by the horizontal wall portion 11 which borders the rear side of the slot 5 and beneath this horizontal wall portion the body is cut away to receive the shiftable jaw plate 12, the forward face of which when it is in normal retracted position, constitutes the rear wall of the saw receiving slot.

In the forward wall of the saw receiving slot 5 at the longitudinal center of the tool, there is formed the vertical recess 13 in which is slidably mounted the anvil body 14, the anvil proper comprising the beveled face 15 at the upper end thereof, against which the forming tooth 10 of the plunger moves. The forward side of the head 2 has a vertical slot 16 therein which opens into the recess 13 and extending through this slot is a screw pin 17 which has its inner end fixed in the anvil body 14 while its outer end has threaded thereon the thumb nut 18 which when tightened against the head 2 holds the anvil body firmly in adjusted position in the recess.

This screw may be moved longitudinally in the slot 16 to adjust the position of the anvil body as desired and the inner surface of the recess is provided with a series of transverse grooves or other markings such as are indicated by the numeral 19, by means of which different desired settings of the anvil may be readily attained for giving the proper set to the teeth of a saw.

The shiftable jaw 12 has secured in the rear face thereof a pair of guide pins 20 which slide in appropriate passages 21 in the rear wall of the head 2 and formed integral with this jaw upon its rear face is a pair of spaced parallel bearing plates 22 which project into the chamber 4 beneath the horizontal wall portion 11 as is clearly illustrated in Figure 1. These bearing plates support a transverse pivot pin 23 upon which is mounted between the plates a gear pinion 24. The ends of the pivot pin extend beyond the plates 22 and each has pivotally attached thereto one end of a flat link arm 25.

Extended into the chamber 4 from the bottom thereof which opens through the under side of the tool body 1, is an end of a trigger handle 26. This end of the trigger handle is pivotally secured in the chamber 4 by the transverse pivot pin 27 which has its ends mounted in the side walls of the chamber as illustrated. At the top of the trigger handle 26 above the pivot pin 27 is a laterally extended bifurcated arm 28 between the furcations at the forward end of which is rotatably mounted upon a transverse pivot a gear pinion 29. As shown this gear pinion 29 is held at a point in advance of the pivotally secured end of the trigger handle 26 so that when the handle is oscillated on its pivot 27 the pinion 29 will be swung in an arc centering about the pivot 27 and as this pinion is in mesh with the pinion 24 which is carried by the shiftable jaw 12 it will be seen that in swinging in its arcuate path it will bear against the pinion 24 and thus force the jaw 12 forwardly.

The upper end of the trigger handle 26 terminates in a transversely rounded fulcrum head 30 which positions in a suitably formed recess 31 in the lower face of the plunger 9. At a point below the fulcrum head 30 and between the same and the pivot 27, the trigger handle carries laterally extending trunnion pins 32 each of which is engaged in a slot 33 formed longitudinally in the adjacent end of a link member 25.

Interposed between the upper end of the trigger handle 26 below the pivot 27 and the rear wall of the body 1 is a suitable spring 34 which normally forces the trigger handle 26 forwardly and thus retracts the plunger 9 and the shiftable clamp jaw 12. This spring is, of course, compressed in the operation of the tool and thus in reacting draws the parts mentioned back to their normal inoperative positions.

The forward portion of the open lower side of the chamber 4 is closed by the removable plate 35 over the forward portion of which the slidable jaw 12 moves.

In the operation of the present tool the toothed edge of the saw is inserted in the usual manner in the slot 5 until the said toothed edge abuts the top of this slot. After the anvil 15 has been adjusted to the desired position the tooth to be set is located in front thereof by shifting the saw in the proper direction and the tool is operated by drawing the trigger handle 26 back toward the fixed handle 3.

When the trigger handle is moved in the manner described the bifurcated gear carrying arm 28 will swing downwardly in an arcuate path and the gear carried thereby will ride over and shove forwardly against the shiftable jaw carried gear 24 thus moving the jaw forwardly into position against the body of the saw and clamping the same firmly in the slot. Further compression of the trigger handle 26 will cause the gears to ride part way past one another and thus effect the further advance movement of the plunger 9 bringing the toothed end 10 thereof against the selected saw tooth and bending the latter over against the anvil 15. The approximate relative positions of the gears 24 and 29, when the shiftable jaw 12 has engaged the saw body and before the plunger has operated against the saw tooth, are illustrated in Figure 2. The pivotal center of the swinging gear 29 will move further to a point slightly below the pivotal center of the gear 23 when the advancement of the plunger 9 is continued to bend the saw tooth in the manner described.

Upon the release of the trigger handle 26 the spring 34 will operate to oscillate the handle back to its former position and the plunger 9 will be withdrawn as will be readily apparent. During this return movement of the trigger handle the pins 32 carried thereby will engage the rear ends of the slots of the links 25 and pulling upon the links will draw the shiftable jaw 12 back to its former position for the release of the saw body.

From the foregoing it will be readily apparent that the mechanism herein described is of a novel character and that there is obtained by the present set the desirable gripping and holding of the saw body in advance of the action of the tooth setting element so that movement or buckling of this saw while the plunger is advancing upon the tooth cannot occur.

Having thus described the invention, what is claimed is:—

1. A saw set comprising a body having a portion formed to receive the toothed edge of a saw, a pair of handles carried by the body one being pivotally mounted for movement relative to the other, an anvil arranged at one side of said portion, a reciprocable plunger carried by the body for movement relative to the anvil, pivotal connecting means between the pivoted handle and the plunger, a shiftable jaw member mounted at one side of said saw receiving portion and movable to secure the saw in the said portion, and a pair of rotatably mounted toothed elements, one thereof carried by the shiftable jaw and the other carried by the pivoted handle, said toothed elements coacting to transmit movement to the said shiftable jaw upon oscillation of the pivoted handle and permitting a predetermined continued movement of the plunger after the jaw has secured the saw blade.

2. A saw set comprising a body having a portion formed to receive the toothed edge of a saw blade, an anvil in one side of said portion, a pair of handles carried by the body, one pivotally mounted for movement relative to the other, a tooth setting plunger slidably mounted in the body for movement relative to said anvil and having pivotal connection with said pivoted handle, a shiftable jaw element movable across said portion parallel with the plunger to secure a saw blade therein, an arm carried by the pivoted handle and directed toward said jaw, and coacting rotatable elements carried by and between the free end of the arm and the jaw whereby the jaw is moved forwardly upon the oscillation of the pivoted handle and continued movement of the handle and plunger is permitted after the jaw has clamped a saw blade in the said portion.

3. A saw set comprising a body having a saw blade edge receiving recess formed transversely thereof, an anvil at one side of said recess, a plunger slidably mounted in the body and movable relative to the anvil, a pair of handles one being pivotally mounted on the body beneath the plunger and having permanent pivotal connection with the plunger at a point above its pivot point, a jaw normally positioned at one side of the recess and movable transversely thereof parallel to the plunger to secure a saw blade therein, a rigid arm carried by and rigid with the handle below the plunger and extending forwardly toward the jaw, coupling means between the free end of said arm and the jaw having free movement relative to the arm whereby movement of the jaw and plunger together is effected until the saw is secured by the jaw and continued movement of the plunger is permitted, and coupling means between the pivoted handle and the jaw for effecting the retraction of the latter.

4. A saw set comprising a body having a recess formed transversely therein for the reception of the toothed edge of a saw, an anvil in one side of said recess, a jaw member mounted in the opposite side of the recess below said anvil and supported for movement transversely of the recess, a pair of handles carried by the body one thereof being pivoted, a plunger reciprocably mounted in the body above the pivoted handle and having pivotal connection therewith to be actuated thereby relative to the anvil, an arm carried by the pivoted handle at a point above its pivotal mounting and extending forwardly toward the said jaw, a toothed element rotatably mounted on the free end of said arm, a toothed element carried by said jaw at its rear side and engaging the toothed element of the arm, and link connecting means between said handle adjacent the rear of said arm and said jaw, said toothed elements operating to shift said jaw forwardly a predetermined distance with said plunger and maintaining the jaw in saw clamping position during the continued movement of the plunger, and said links operating to retract the jaw upon the reverse movement of the pivoted handle.

5. A saw set, comprising a body constituting a head and having a saw blade edge receiving recess transversely therein, a handle rigid with the head, a handle pivotally connected to the head, an anvil in said recess, a plunger slidable in the head to move across said recess relative to the anvil, coupling means between the pivoted handle and the plunger, a clamping jaw movable in the head parallel with the plunger and across the recess, a rotatable element carried by the jaw, a rotatable element carried by the pivoted handle and moved by the handle in an arcuate path across and in engagement with the first mentioned element, said elements coacting to shift the jaw to and hold it in saw clamping position during the period of operation of the plunger on a tooth of the saw, and a link connection between the pivoted handle and the jaw operating to retract the latter upon the movement of the pivoted handle in one direction.

6. A saw set, comprising an elongated body constituting a head and having a saw blade edge receiving recess formed transversely thereof adjacent one end, a handle rigid with and extending obliquely from the end of the head remote from said recess, a second handle having one end pivoted to the head for movement relative to the fixed handle, an anvil adjustably mounted in the wall of said recess nearest the end adjacent thereto, a plunger mounted for movement longitudinally in the head and arranged for coaction with said anvil, coupling means between the pivotally mounted handle and the plunger, a pair of ears projecting laterally from the sides of said head upon the side of the recess opposite the anvil, a jaw member countersunk in the wall of the recess opposite the anvil, guide elements carried by said jaw and slidable in apertures in said ears, a rotatable member carried by the jaw, a second rotatable member carried by the pivoted handle and located forwardly from the pivotal center thereof and engaging the first rotatable member, said second rotatable member moving in an arcuate path across the first member and in contact therewith to shift said jaw and hold the same in a predetermined position during a period in the movement of the plunger.

7. A saw set, comprising a body formed to receive the toothed edge of a saw blade, an anvil in one side of said portion, a pair of handles carried by the body one being pivotally attached for movement relative to the other, a plunger slidably mounted in the body for movement relative to said anvil, connecting means between the pivoted handle and the plunger whereby movement is imparted to the plunger from the handle, a jaw shiftably carried by the body for movement transversely of said portion in a path parallel with the plunger, an element rotatably supported by the pivoted handle for movement in a path transversely of the path of movement of said jaw when the pivoted handle is oscillated, and means carried by the movable jaw for coacting rolling contact with said rotatably mounted member to effect movement of the jaw with the plunger and to permit continued movement of the plunger after the jaw has engaged a saw blade inserted into the saw receiving portion of the body.

8. A saw set, comprising a body formed to receive the toothed edge of a saw blade, an anvil in one side of said portion, a pair of handles carried by the body one being pivotally attached for movement relative to the other, a plunger slidably mounted in the body for movement relative to said anvil, connecting means between the pivoted handle and the plunger whereby movement is imparted to the plunger from the handle, a jaw shiftably carried by the body for movement transversely of said portion in a path parallel with the plunger, and a pair of connected rotatably mounted elements carried one by said pivoted handle and the other by said jaw, for effecting the movement of the jaw into clamping engagement with a saw blade inserted in said body portion and to permit continued movement of the plunger after the saw blade is secured, that element carried by the pivoted handle moving in a path extending transversely of the path of movement of the jaw.

EDWARD FELSMAN.